United States Patent
Acedo Sánchez et al.

(10) Patent No.: US 8,610,298 B2
(45) Date of Patent: Dec. 17, 2013

(54) METHOD OF OPERATION OF A WIND TURBINE TO GUARANTEE PRIMARY OR SECONDARY REGULATION IN AN ELECTRIC GRID

(75) Inventors: Jorge Acedo Sánchez, Sarriguren (ES); Ainhoa Cárcar Mayor, Sarriguren (ES); Jesús Mayor Lusarreta, Sarriguren (ES); Javier Pérez Barbachano, Sarriguren (ES); Susana Simón Segura, Sarriguren (ES); David Solé López, Sarriguren (ES); Mikel Zabaleta Maeztu, Sarriguren (ES); Luis Marroyo Palomo, Sarriguren (ES); Jesús López Taberna, Sarriguren (ES)

(73) Assignee: Ingeteam Power Technology, S.A., Bizkaia (ES)

( * ) Notice: Subject to any disclaimer, the term of this patent is extended or adjusted under 35 U.S.C. 154(b) by 570 days.

(21) Appl. No.: 12/920,610

(22) PCT Filed: Mar. 3, 2009

(86) PCT No.: PCT/ES2009/000110
§ 371 (c)(1),
(2), (4) Date: Nov. 10, 2010

(87) PCT Pub. No.: WO2009/112605
PCT Pub. Date: Sep. 17, 2009

(65) Prior Publication Data
US 2011/0057445 A1    Mar. 10, 2011

(51) Int. Cl.
*H02P 9/04* (2006.01)
*F03D 9/00* (2006.01)

(52) U.S. Cl.
USPC .............................. 290/44; 700/287

(58) Field of Classification Search
USPC ........................ 290/43, 44; 700/298, 287, 9
See application file for complete search history.

(56) References Cited

U.S. PATENT DOCUMENTS 5,083,039 A * 1/1992 Richardson et al. ............ 290/44
7,615,880 B2 * 11/2009 Kikuchi et al. ................. 290/44
(Continued)

FOREIGN PATENT DOCUMENTS

EP        1 467 463        10/2004

OTHER PUBLICATIONS

International Search Report issued Jul. 9, 2009 in International (PCT) Application No. PCT/ES2009/000110.

(Continued)

*Primary Examiner* — Nicholas Ponomarenko
(74) *Attorney, Agent, or Firm* — Sughrue Mion, PLLC

(57) ABSTRACT

The invention controls the network frequency via an active power reserve obtained by interacting in a coordinated manner with the speed regulation that acts on the power generated or on the pitch angle, to guarantee primary or secondary regulation across the whole range of wind speed.

10 Claims, 3 Drawing Sheets

(56) References Cited

U.S. PATENT DOCUMENTS

| | | | |
|---|---|---|---|
| 7,880,321 B2 * | 2/2011 | Arinaga et al. | 290/44 |
| 7,884,492 B2 * | 2/2011 | Xiong et al. | 290/55 |
| 7,960,849 B2 * | 6/2011 | Lopez Taberna et al. | 290/44 |
| 8,053,917 B2 * | 11/2011 | Wakasa et al. | 290/44 |
| 8,217,524 B2 * | 7/2012 | Nakashima et al. | 290/44 |
| 8,242,619 B2 * | 8/2012 | Arinaga et al. | 290/44 |
| 8,355,824 B2 * | 1/2013 | Yasugi | 700/287 |
| 2007/0085343 A1 | 4/2007 | Fortmann | |
| 2010/0213712 A1 * | 8/2010 | Arinaga et al. | 290/44 |
| 2011/0074152 A1 * | 3/2011 | Yasugi | 290/44 |
| 2012/0061961 A1 * | 3/2012 | Yasugi et al. | 290/44 |
| 2012/0286511 A1 * | 11/2012 | Kikuchi et al. | 290/44 |
| 2013/0001955 A1 * | 1/2013 | Wakasa et al. | 290/55 |
| 2013/0038061 A1 * | 2/2013 | Rivas et al. | 290/44 |
| 2013/0079945 A1 * | 3/2013 | Achilles et al. | 700/298 |

OTHER PUBLICATIONS

G. Ramtharan et al., "Support for Spinning Reserve from DFIG based wind turbines," Second International Conference on Industrial and Information Systems, 2007, pp. 111-116, Aug. 2007.

J. Ekanayake et al., "Comparison of the Response of Doubly Fed and Fixed-Speed Induction Generator Wind Turbines to Changes in Network Frequency", Energy Conversion, IEEE Transaction, Dec. 2004, vol. 19, issue 4, pp. 800-802.

G. Lalor et al., "Frequency Control and Wind Turbine Technologies", Power Systems, IEEE Transactions, Nov. 2005, vol. 5, issue 4, pp. 1905-1913.

J. Morren et al., "Wind Turbines Emulating Inertia and Supporting Primary Frequency Control", Power Systems, IEEE Transactions, Feb. 2006, vol. 21, issue 1, pp. 433 and 434.

* cited by examiner

METHOD OF OPERATION OF A WIND TURBINE TO GUARANTEE PRIMARY OR SECONDARY REGULATION IN AN ELECTRIC GRID

OBJECT OF THE INVENTION

The invention relates to a method of operation of a wind turbine to guarantee primary o secondary regulation in an electric grid across the whole range of wind speed range, acting on the speed regulators of the turbine itself in such a manner as to obtain and manage an active power reserve wherefrom primary or secondary regulation is obtained.

BACKGROUND OF THE INVENTION

In an electric power grid, power consumption and generation must be constantly controlled in order to maintain both network frequency and voltage within the permitted limits. The distribution network constantly monitors the two magnitudes and must be capable of sending orders to the generating units in order to stabilise the electric power of the grid. As a consequence of this requirement, the power-generating units must be capable of regulating the power, whether primary or secondary. Understanding primary regulation to be the generation of power equal to that assigned, plus a value proportional to frequency deviation, to react to frequency variations with a time constant in seconds, and understanding secondary regulation to be that which is responsible for restoring the frequency in minutes. Therefore, when an imbalance occurs in an area, initially, all the power stations will contribute to compensate it.

In recent years, the power generated by wind farms has increased significantly worldwide. Wind farms are growing in size and installed capacity, and the importance of improving both the delivered power quality and grid stability will be a challenge of great importance to both wind farm developers and the electricity distribution network. As wind-power generated is injected into the network, care must be taken to ensure that wind farm behaviour is as similar as possible to other conventional power generation sources, taking the specific nature of the wind into account.

As mentioned earlier, from the viewpoint of the company that owns the distribution network, it is important to accurately control network voltage and frequency. To this end, conventional power generation plants must deliver an extra supply of active power when required by the grid. At present, wind farms do not adequately meet these types of demands, deriving in the restriction of wind farm expansion. To date, a wind farm cannot be considered as a conventional power generation plant due to the impossibility of accurately determining an active power reserve due to the specific nature of the wind. Contrary to the power sources of conventional power generation plants (coal, oil, gas, uranium, etc.), wind is an uncontrolled and highly unpredictable resource. In fact, conventional methods have not been capable of accurately estimating the active power reserve or accurately meeting power demands. Consequently, there is an evident need to develop an efficient method for generating an active power reserve whenever the grid requires it. In fact, it must be highlighted that on some occasions advantageous economic conditions can even be offered to those capable of satisfying network demands in terms of active power reserve.

Patent EP1282774 (Aloys Wobben) proposes a method by means of which the turbine reduces the active power delivered to the electric grid when network frequency increases. Patent US2007085343 (Jens Fortmann, Repower System AG) includes a method for providing extra power if frequency variations are detected in order to participate in primary regulation, although in a transitory manner. Finally, EP1467463 (Lütze, Hans Henning, et al., General Electric Company), claims a method for controlling the power delivered by a wind farm based on network frequency.

The document by Ramtharan, Support for spinning reserve from DFIG-based wind turbines, proposes working with a low-torque set point (or even zero) and regulating the machine with the pitch at maximum speed. When it receives an order from the operator it changes its torque reference, taking the machine to its optimal point. This technique does not guarantee a quantified reserve as the available power reserve depends on wind speed at all times.

None of the aforementioned documents allows or guarantee the amount of available power as an active power reserve, nor do they manage it under the conditions required by electric grid operators.

The invention proposed has several advantages over current systems for controlling active power and frequency in wind farms.

One of the advantages of the present invention is that it achieves an active power reserve under the conditions required by grid operators from conventional power generation plants. An active power reserve with respect to producible power at a given time for each of the machines is ensured, thereby achieving an active power reserve at wind farm level.

An additional advantage of this method is that it allows a bidirectional variation in active power, i.e. it can achieve a gradual increase or decrease in active power. Additionally, this active power reserve is controlled by sufficient dynamics to guarantee primary or secondary regulation across the whole range of machine power outputs.

Another advantage is its independence with respect to the wind farm's communications network, as each of the turbines is equipped with an internal control, in such a manner that frequency variations are detected by the wind turbine itself, ensuring the reaction of the controller even in the event that communication with the farm is interrupted.

Another additional advantage is that frequency-reserve regulation does not compromise machine speed regulation at any time, as it interacts with the turbine's speed controllers at all times.

In conclusion, the present invention has a method that is capable of guaranteeing primary and secondary regulation. Said regulation allows wind farm behaviour to be as similar as possible to that of conventional power generation sources, collaborating in network frequency stabilisation and contributing to increase the penetration of renewable energies in the electric grid.

DESCRIPTION OF THE INVENTION

In order to achieve the objectives and resolve the aforementioned drawbacks, the invention consists of a new method of operation of a wind turbine with variable pitch and speed that guarantees primary and secondary regulation of an electric grid, for which purpose it allows an active power reserve to be obtained, taking the electric grid operator's requirements into account at all times. The invention ensures full control of the active power reserve in the wind turbine, thereby contributing to network frequency regulation, in the same manner as in a conventional non-wind power generation plant.

The invention proposed provides the capacity to increase or decrease the active power generated in order to maintain network frequency stability, in the event of imbalances caused by variations in power generation or consumption.

In a variable pitch wind turbine, the power extracted from the wind depends on the angle of blade attack, which is known as pitch angle. By varying the pitch angle, the point of operation of the wind turbine can be shifted away from its optimal position with the objective of varying the power extracted from the wind. Under normal operating conditions, this angle is maintained at its optimal point, that of maximum power extraction. Additionally, current variable speed machines also allow the power supplied to the grid to be controlled by means of a power converter.

Consequently, conventional variable pitch wind turbines have a pitch angle actuator to control extracted power, and a power converter to control the power generated by the wind turbine.

In the present invention, frequency control is integrated in speed regulation. Speed regulation is achieved by acting on the power extracted from the wind (speed regulation that acts on pitch) and on power generated (speed regulation that acts on power).

The invention allows management of the active power reserve in order to contribute, when necessary, to stabilising network frequency in a manner compatible with the wind turbine rotation speed control within the allowed range.

To this end, the invention is characterised in that it comprises a network frequency control based on an active power reserve obtained from the regular interaction with the speed regulator that acts on the power generated or on the pitch angle, or a combination of both.

To this end, it calculates the percentage of power over maximum producible power that must be increased or decreased based on frequency deviation. This percentage is what is known as active power reserve.

In low wind conditions, the extractable power is less than the nominal value; in this case the lower limit of the pitch angle is saturated, as nominal operating speed is not reached and the wind turbine draws on the power generated to reach its optimal operating speed.

In this case, the pitch angle must effectively carry out frequency regulation. The frequency regulator modifies the lower limit of pitch angle saturation. If frequency is greater than the nominal value, the power extracted from the wind must be reduced, whereby the lower limit of the pitch angle is moved away from its optimal point of operation.

If on the contrary, frequency is less than the nominal value, power capture must be increased. To this end, it requires a power reserve. This active power reserve will be used by moving the lower limit of angle pitch saturation closer to its optimal point.

In order to perform the previously explained functionality, the invention establishes a relationship between frequency and reference pitch angle. The technique is based on the curves that relate Cp and λ. Said characteristic curves for each type of blade relate the following variables:

Cp, which represents aerodynamic power capture output;
λ, which is the specific speed $\lambda = \omega R/u$, where u is wind speed, ω is angular rotation speed and, together with u, can be filtered, R is the blade radius; and β is pitch angle.

To this end, the method of the invention envisages that in this case the active power reserve will be obtained through the following phases:
Calculation of network frequency deviation with respect to its nominal value.
Calculation of the necessary active power reserve to compensate the calculated frequency deviation.
Calculation of minimum pitch angle based on the calculated active power reserve and updating of the lower limit of the speed regulator that acts on the pitch angle.
Operation of the wind turbine applying the updated limits in the speed regulator that acts on the pitch angle.

In turn, pitch angle is obtained from the following phases:
Calculation of the range of points of operation of turbine rotor blade tip speed (λ).
Obtention of a family of curves that relate different percentages of the optimal power coefficient (Cpopt) with the associated pitch angle for each blade tip speed (λ) of the range calculated in the preceding point based on said turbine rotor power (Cp)-blade tip speed (λ) output coefficient curves.
Calculation of the point of operation of the current blade tip speed (λ).
Interpolation on the family of curves to obtain the minimum pitch angle.

Therefore, the desired percentage of extractable power to be reserved is calculated and the pitch angle modified, in such a manner that the variation of Cp at the point of operation allows the necessary active power reserve to be obtained. In this case, the active power reserve is controlled by varying the pitch angle and rotation speed is regulated based on the power generated, in such a manner that if the power delivered to the grid is less than that extracted from the wind, rotation speed will increase and vice versa.

Under strong wind conditions, whereby the extractable power is greater than the nominal value, the upper active power limit of the speed regulator that acts on the power is saturated, as its nominal operating speed has been reached and the pitch angle will ensure that the wind turbine reaches its nominal operating speed.

In this case, the power generated must effectively carry out frequency regulation. The frequency regulator modifies the upper saturation limit of the speed regulator that acts on the power. If the frequency is greater than the nominal value it must lower the upper saturation limit of the speed regulator that acts on the power.

If on the contrary, frequency is less than the nominal value, power production must be increased. To this end, a power reserve is required. It will use this power reserve by moving the upper saturation limit of the speed regulator that acts on the power closer to the nominal power.

To this end, the method of the invention envisages that in this case the active power reserve will be obtained from the following phases:
Calculation of network frequency deviation with respect to its nominal value.
Calculation of necessary active power reserve to compensate frequency deviation.
Calculation of the maximum power limit to be generated based on the calculated active power reserve and updating of the upper limit of the speed regulator that acts on the power generated.
Operation of the wind turbine applying the updated limits in the speed regulator that acts on wind power power.

In this case, the pitch angle is responsible for controlling wind turbine rotation speed, i.e. it controls power capture from the wind so that the difference between generated and captured power does not cause variations in speed.

In the foregoing cases, the necessary active power reserve is obtained through a regulator that acts based on frequency error, to which the power reserve corresponding to nominal speed is added. Said regulator is of proportional type in the case of primary regulation or of proportional integral type, or a more complex structure (for example with upper and lower limits, anti-windup, etc.), in the case of secondary regulation.

The invention envisages that the nominal active power reserve, i.e. the reserve corresponding to nominal frequency, is calculated by the wind turbine controller or received via the wind farm network.

More specifically, the nominal active power reserve is recorded as a percentage of producible power at a given time or as a percentage of nominal power.

Consequently, the invention uses the two speed regulators that are conventionally incorporated in variable pitch and variable speed turbines, which are always active, and the frequency regulator will be responsible for modifying the saturation limits of the regulators as described.

Below, in order to better understand this specification, a set of figures has been included as an integral part thereof, wherein the object of the invention has been represented in an illustrative and non-limiting manner.

DESCRIPTION OF THE PREFERRED FORM OF EMBODIMENT

Below, a description of the invention is provided based on the foregoing figures.

The method of the invention provides the capacity to increase or decrease the active power generated by the turbine in order to maintain the network frequency stability in the event of imbalances caused by variations in active power generation or consumption, due to which the method ensures full control in the generation of an active power reserve in the wind turbine.

In order to address frequency variations, power captured must be controlled at all times to prevent the wind turbine from operating outside of the permitted speed ranges.

Traditional operating methods maintain an optimal pitch angle ($\beta$) until reaching nominal speed and speed regulation is obtained through power regulation. When the wind turbine is contributing its nominal power, speed regulation is obtained by shifting the pitch angle ($\beta$) away from its optimal value.

The present invention modifies the conventional operating method, in order to guarantee primary or secondary regulation of network frequency.

The invention contributes to network frequency by varying an active power reserve that is dynamically controlled and acts on turbine speed regulation. Frequency (104) is controlled in a coordinated manner using the speed regulators that act on pitch (102) and power (103).

Figure 1:
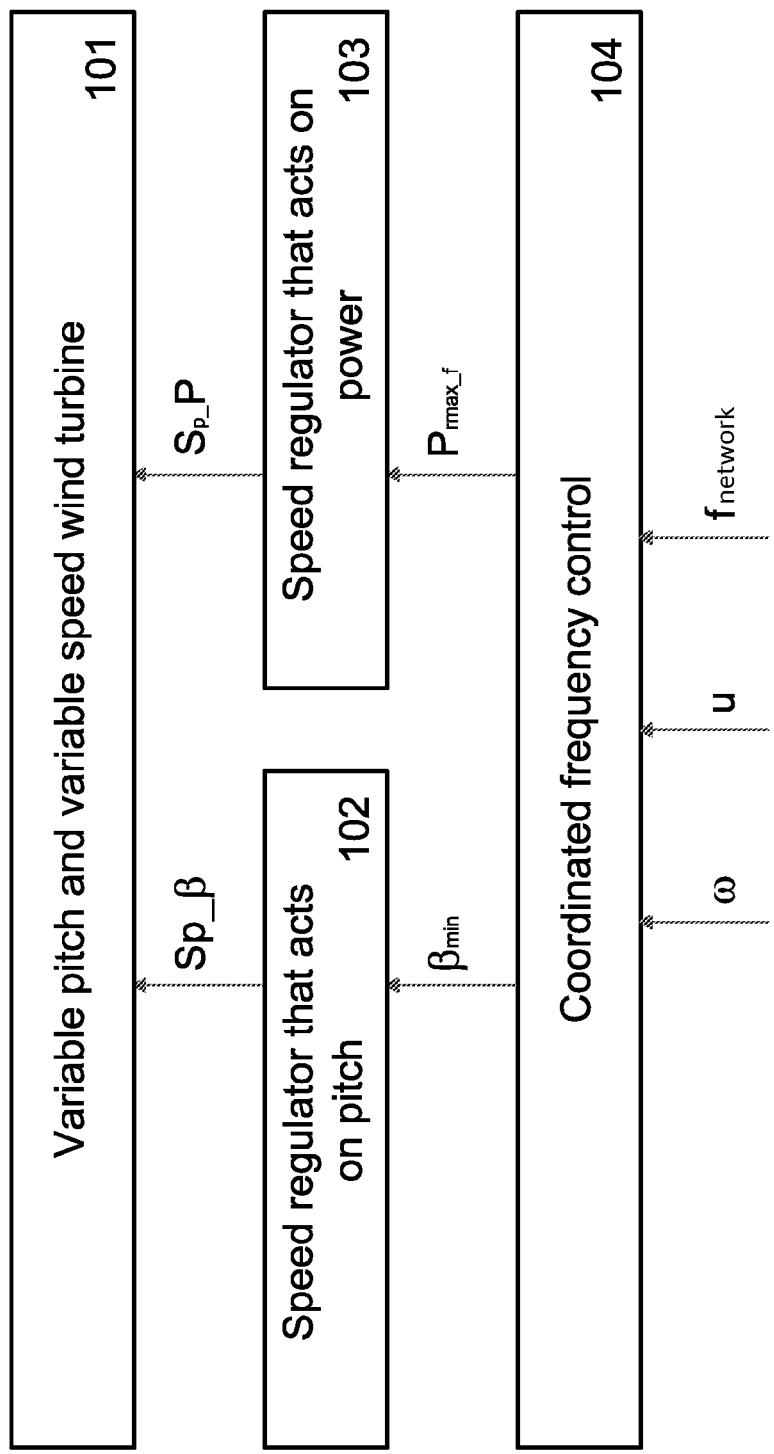
FIG. 1 shows a functional block diagram of the coordinated power and pitch angle control, according to the process of the invention.
Figure 2:
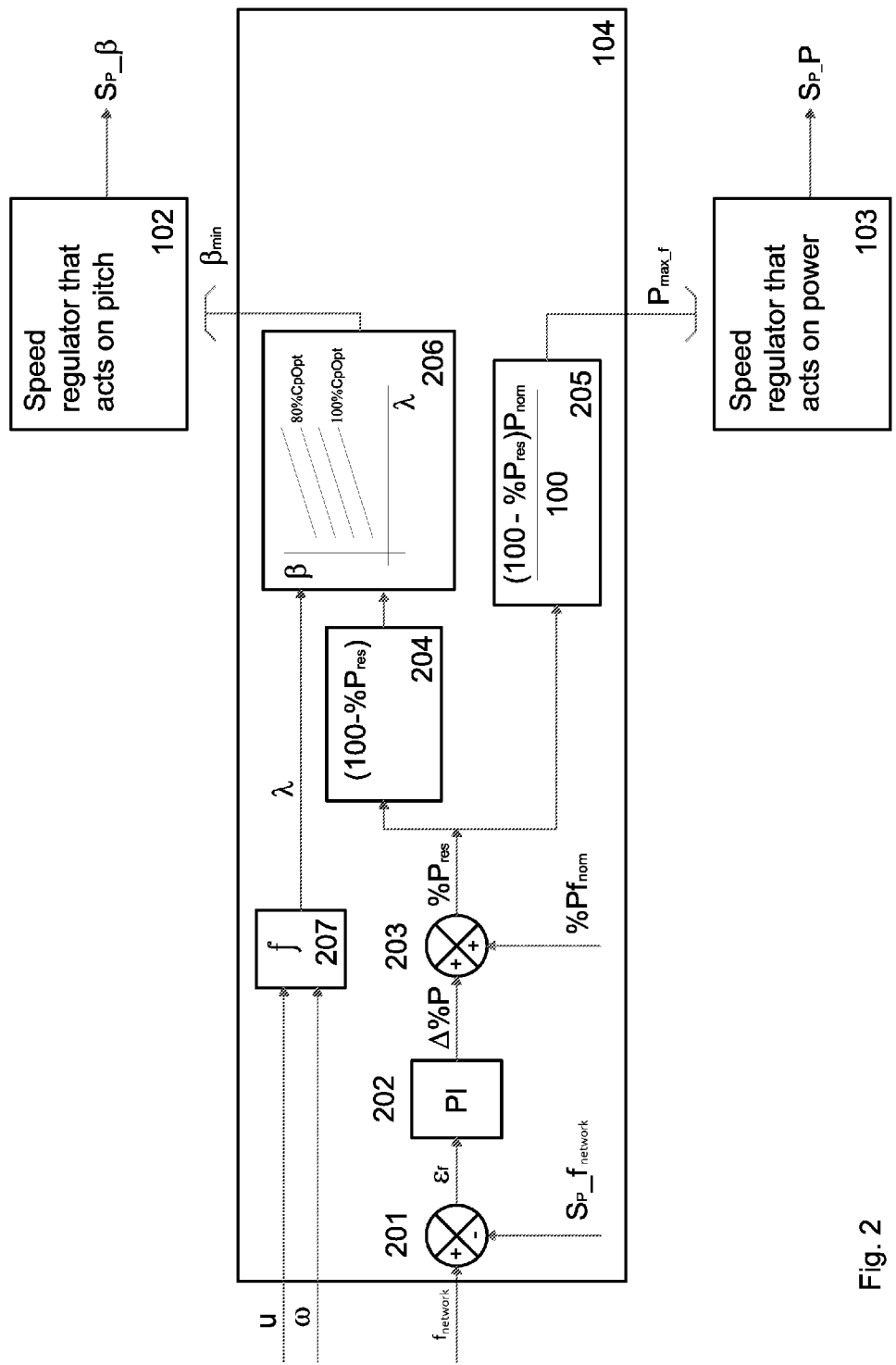
FIG. 2 shows a functional block diagram of a example of preferred embodiment.
Figure 3:
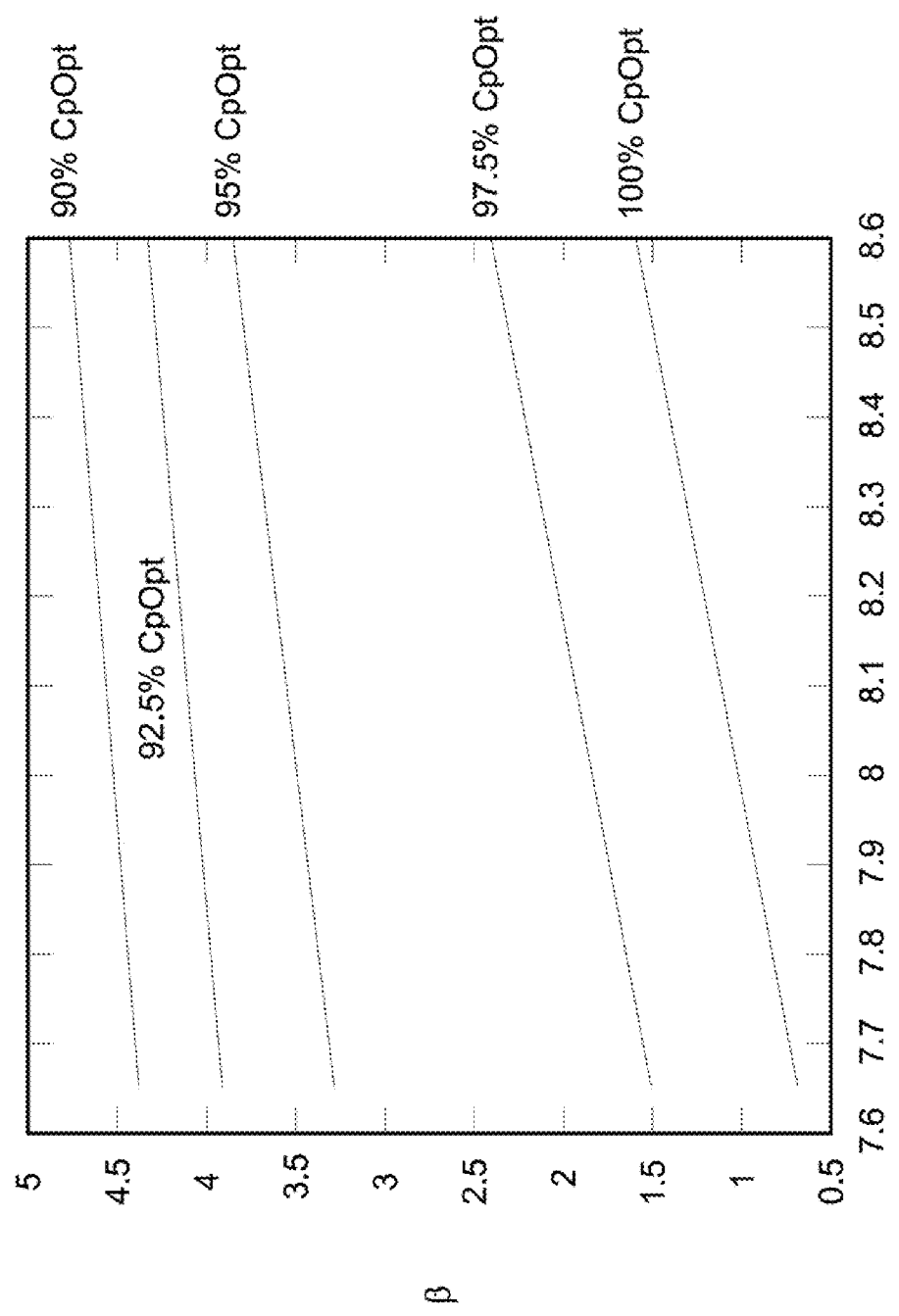
FIG. 3 shows a graphic of the relationship between blade tip speed/wind speed ($\lambda$) and the pitch angle for different percentages of the optimal power coefficient for a specific blade profile.

In either of the two cases the coordinated frequency control module (104), as shown in FIG. 2, compares frequency ($f_{network}$) (201) with setpoint frequency ($S_{p\_f_{network}}$) corresponding to nominal frequency and introduces the difference ($\epsilon_f$) in a regulator (202), for example a proportional regulator P for primary regulation or a proportional integral regulator PI for secondary regulation. The output of said regulator (202) is a variation of the percentage of active power reserve ($\Delta\%P$), which is applied to an adder (203) to be added to the nominal active reserve (%$Pf_{nom}$ reserve) corresponding to nominal frequency) in order to obtain the percentage of power reserve (%$P_{res}$). For example, if frequency is greater than nominal frequency, $\Delta\%P$ will increase, causing an increase in total reserve (equal to the nominal active reserve corresponding to the nominal frequency plus the variation stemming from the regulator) and vice versa in the opposite case. This active power reserve is obtained by interacting with the two turbine speed regulation loops, that of the regulator that acts on the pitch angle (102) and that of the regulator that acts on the power generated (103), through the saturation limits (FIG. 2).

The value of the nominal active power reserve, i.e. the value of the reserve at nominal frequency (%$P_{res}$), can stem from the exterior of the turbine via the wind farm's communications network or can be calculated locally in the turbine (for example, by means of hourly programming) by the wind turbine controller.

Up to this point, the process is common to both cases.

In the case of low winds, the speed regulator that acts on the pitch angle (102) is actuated; the next step is to calculate the laws that will allow us to obtain the variation in producible power with the variation in pitch angle for each point of operation, value $\lambda$. To this end, the following are required:

Variations in power with respect to producible power, i.e. variations in power coefficient (Cp), required to address the envisaged frequency variations (% of power reserve that is compromised in frequency regulation), which is calculated in the module (204).

Expected variations of $\lambda$, maximum and minimum value, during wind turbine operation, caused by the variations in rotation and wind speed that are determined in the module (206). The value of $\lambda$ is calculated in the module (207) by a function that initially takes the input value of u (wind speed) and $\omega$ (angular rotation speed). Said function, in the preferred embodiment, includes filtering of input signals.

Where $\lambda=\omega R/u$ as described under section the dedicated to the description of the invention.

In order to facilitate calculation, n points distributed over the range of variations of $\lambda$ will be considered. Similarly, m points distributed over the range of variations of Cp (i.e. percentages between 0 and 100% of producible power, associated to the optimal Cp, $Cp_{opt}$) will be considered. For each combination of $\lambda$ and Cp, the corresponding n×m pitch angles are calculated, obtaining a table of results that will allow, by means of interpolation, the necessary pitch angle to generate a specific active power reserve for all the points of operation (characterised by different values of $\lambda$) to be obtained (FIG. 4).

If we enter the aforementioned table with the calculated percentage of Cp, value of 100 –%Pres, and the value of $\lambda$ corresponding to the point of operation, a pitch angle ($\beta_{min}$) is obtained that will be used as the lower limit of the speed regulator that acts on the pitch (102).

The value ($S_{p\_\beta}$) will be the output of the speed regulator that acts on the pitch. Said output is the signal for the wind turbine (101) pitch actuator.

In the case of strong winds, the speed regulator that acts on power (103) is actuated; the reserve percentage value (%$P_{res}$) is used in the following formula to calculate maximum power based on frequency ($P_{max\_f}$):

$$P_{max\_f} = \frac{(100 - \% P_{res})P_{nom}}{100}$$

which is calculated in the module (205).

Where $P_{max\_f}$ will be used as the upper limit of the speed regulator that acts on the power (103), provided that this value is less than the upper limit of said regulator, understanding upper limit of said regulator to be the maximum power value used under normal operating conditions when there is no frequency control.

The value ($S_{p\_}P$) will be the output of the speed regulator that acts on the power. Said output is the signal for the wind turbine power converter (101).

The invention claimed is:

1. A method of operation of a wind turbine to guarantee primary or secondary regulation in an electric grid, applicable to a variable pitch and a variable speed wind turbine, comprising,
controlling the network frequency by guaranteeing a specific percentage of active power reserve, the active power reserve being achieved by controlling, in a coordinated manner, speed regulation of the wind turbine by selectively performing one of:
a) controlling an upper limit of a speed regulator that acts on the generated power of the wind turbine;
b) controlling a lower limit of a speed regulator that acts on a pitch angle of the wind turbine, and;
c) controlling both the upper limit of the speed regulator that acts on the generated power and the lower limit of the speed regulator that acts on the pitch angle;
wherein, when controlling the upper limit of the speed regulator that acts on the generated power, the speed regulation comprises:
calculation of a network frequency deviation with respect to a nominal value for the network frequency;
calculation of the necessary active power reserve to compensate for the calculated frequency deviation;
calculation of a maximum limit of power to be generated based on the calculated active power reserve and updating of the upper limit of the speed regulator that acts on the power generated; and
operation of the wind turbine by applying the updated limits to the speed regulator that acts on the wind turbine output;
and wherein, when controlling the lower limit of the speed regulator that acts on the pitch angle, the speed regulation comprises:
calculation of the network frequency deviation with respect to the nominal value for the network frequency;
calculation of the necessary active power reserve to compensate for the calculated frequency deviation;
calculation of a minimum pitch angle based on the calculated active power reserve and updating of the lower limit of the speed regulator that acts on the pitch angle; and
operation of the wind turbine by applying the updated limits to the speed regulator that acts on the pitch angle.

2. The method of operation of a wind turbine to guarantee primary or secondary regulation in an electric grid, according to claim 1, wherein the necessary active power reserve is obtained, through a regulator that acts based on the error frequency, by adding to the active power reserve corresponding to the nominal frequency of the wind turbine, an active power reserve increment corresponding to the error frequency.

3. The method of operation of a wind turbine to guarantee primary or secondary regulation in an electric grid, according to claim 2, wherein said regulator that acts based on the error frequency, is selected from among a proportional regulator, a proportional integral regulator and a complex transfer function.

4. The method of operation of a wind turbine to guarantee primary or secondary regulation in an electric grid, according to claim 1, wherein the active power reserve is obtained using the percentage of maximum power, and is used to generate the upper limit of the speed regulator that acts on the power generated.

5. The method of operation of a wind turbine to guarantee primary or secondary regulation in an electric grid, according to claim 1, wherein the calculation of the minimum pitch angle is obtained by:
calculation of a range of points of operation of a turbine blade tip speed,
obtaining a family of turbine rotor power-blade tip speed output coefficient curves that relate different optimal power coefficient percentages with an associated pitch angle for each blade tip speed in the calculated range,
calculation of a current point of operation of blade tip speed, and
interpolation on the family of curves to obtain the minimum pitch angle.

6. The method of operation of a wind turbine to guarantee primary or secondary regulation in an electric grid, according to claim 1, wherein the active power reserve which corresponds to the nominal frequency is selectively calculated by a wind turbine controller and selectively received via a wind farm network.

7. The method of operation of a wind turbine to guarantee primary or secondary regulation in an electric grid, according to claim 1, wherein the active power reserve which corresponds to the nominal frequency is selectively assigned as a percentage of the producible power at a given time and a percentage of the nominal power.

8. The method of operation of a wind turbine to guarantee primary or secondary regulation in an electric grid, according to claim 1, wherein the active power reserve increases when the network frequency increases and decreases said active power reserve when the network frequency decreases.

9. A wind farm, comprising at least one variable pitch and variable speed turbine, wherein at least one of said variable pitch and variable speed turbines acts according to the method of claim 1.

10. The method of operation of a wind turbine to guarantee primary or secondary regulation in an electric grid, according to claim 1, wherein
a) the active power reserve is obtained using the percentage of maximum power to generate the upper limit of the speed regulator that acts on the generated power; and wherein
b) the calculation of the minimum pitch angle is obtained by:
calculation of the range of points of operation of the turbine blade tip speed,
obtaining a family of curves that relate different optimal power coefficient percentages with the associated pitch angle for each blade tip speed of the calculated range based on said turbine rotor power-blade tip speed output coefficient curves, calculation of the current point of operation of blade tip speed, and interpolation of the family of curves to obtain the minimum pitch angle.

* * * * *

UNITED STATES PATENT AND TRADEMARK OFFICE
CERTIFICATE OF CORRECTION

PATENT NO. : 8,610,298 B2
APPLICATION NO. : 12/920610
DATED : December 17, 2013
INVENTOR(S) : Jorge Acedo Sánchez et al.

Page 1 of 1

It is certified that error appears in the above-identified patent and that said Letters Patent is hereby corrected as shown below:

On the Title Page, item [30] insert:

--Foreign Application Priority Data

March 14, 2008 (ES)................................P200800760--

Signed and Sealed this
Eleventh Day of November, 2014

Michelle K. Lee
*Deputy Director of the United States Patent and Trademark Office*